July 5, 1932.  W. BRADLEY  1,865,554
BALLING FINE GRAINED MATERIAL FOR SINTERING Filed Feb. 1, 1930

Inventor:
Wilson Bradley

Patented July 5, 1932

1,865,554

UNITED STATES PATENT OFFICE

WILSON BRADLEY, OF DEERWOOD, MINNESOTA, ASSIGNOR TO BRADLEY-FITCH COMPANY, OF MINNEAPOLIS, MINNESOTA, A CORPORATION OF MINNESOTA

BALLING FINE GRAINED MATERIAL FOR SINTERING

Application filed February 1, 1930. Serial No. 425,084.

The present invention relates to sintering, and has particular reference to methods and apparatus for preparing fine grained materials which cannot be sintered readily by the ordinary processes into a form which is readily sinterable.

Sintering requires formation of a bed of material through which air may be passed to effect the necessary combustion of carbon in the material. Heretofore, the sintering of certain materials has been very imperfect, resulting in the formation of unsintered fines or "returns", which are again put through the sintering process in a succeeding batch. Certain materials, especially fine grained materials, have not been sintered heretofore, for the reason that the particles are too fine in size to form a porous bed for passage of air. For the old processes of sintering the materials are generally divided into three classes (1) easy to sinter, (2) hard to sinter, and (3) impossible to sinter. The hard-to-sinter materials give high "returns" and therefore the process with them is not efficient. The impossible-to-sinter materials are usually too fine-grained but in composition may, nevertheless, be very suitable for sintering.

One of the most important materials which it is desired to sinter and which cannot be sintered directly by methods used heretofore is blast furnace sludge. In the top gases from blast furnaces, dust particles are carried away. The top gases are washed from this dust forming a sludge which is chiefly iron oxide and carbon in extremely fine grained size. The mixture frequently has a composition which is suitable for sintering.

The present invention aims to sinter materials such as blast furnace sludge with a high degree of efficiency, and also to permit sintering of the hard-to-sinter materials with practically no returns.

One object of the invention is to ball the fine particles wet with a limited amount of moisture, into a conglomerate, ball-like mass suitable for sintering.

Another object is the provision of means for malling the dust or fines.

A more specific object is the balling for sintering of blast furnace sludge to produce a useful iron product.

Figure 1:
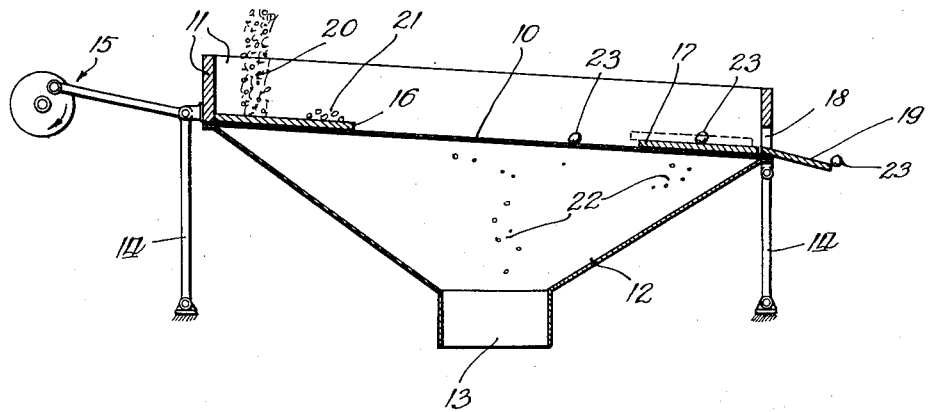
Figure 2:
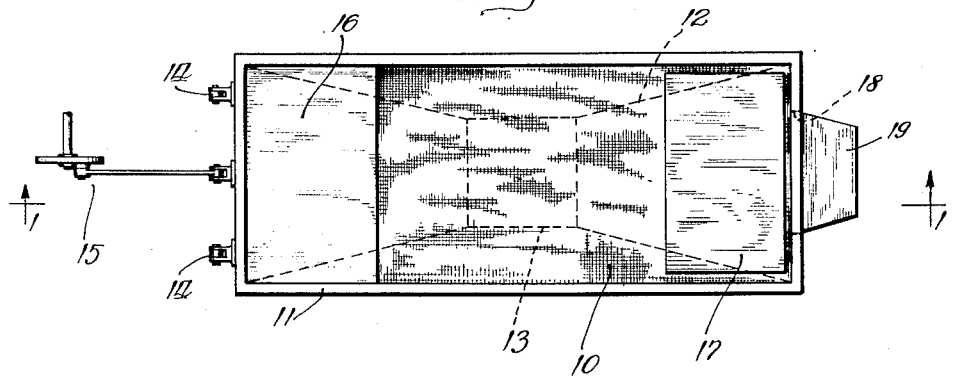

Other objects and advantages will become apparent from the following description of a process and apparatus which exemplifies a preferred embodiment of the invention, illustrating the same by reference to blast furnace sludge, the apparatus being illustrated in the accompanying drawing in which Fig. 1 is a cross sectional view of a screen for balling material, taken along the line 1—1 of Fig. 2.

Fig. 2 is a plan view of the screen of Fig. 1.

It is of course to be understood that the invention is not to be considered as limited by the disclosures herein made for the purpose of illustrating the invention in such a way that those skilled in the art may be enabled to practice it, but it is to be considered as broader in scope and to include such modifications, variations and changes as may fall within the scope of the appended claims.

I have found that dust or fines may be moistened with liquid, not necessarily containing a binding agent, but permissibly so, and subjected to a rolling motion, or rotating or vibratory motion which can result in some rolling action, with the result that the dust or fines can be agglomerated into small balls of a size suitable for sintering. I prefer water as the moistening agent. The amount of water of course depends upon the specific material. If the preferred quantity is used the balls do not exhibit moisture at the surface. If more than the preferred amount of water is employed the balls will exhibit to the eyes a showing of water at the surface, without, however, destroying the ability of the balls to sinter. The determination of the proper quantity of water for a specific material is a simple matter readily accomplished by a little experimentation with different proportions to produce a good strong ball which is not too wet at the surface.

Carbon, such as coke, may be mixed initially with the dust or fines in a desired proportion, as determined by the usual requirements for sintering, and the mixture balled, and then sintered. The material and the carbon may be separately fed to the balling apparatus, or simultaneously fed in the same stream without previous mixing, there to be mixed and balled simultaneously.

Blast furnace sludge contains iron oxide and carbon, and frequently the two are in such proper proportion that the material may be balled and sintered without other treatment to make a suitable composition. The invention contemplates that blast furnace sludge containing at least sufficient carbon for sintering be balled directly and sintered. Such a product has been found to give a 100% sinter without the formation of returns.

As one example of apparatus for balling there is shown in the drawing a shaking screen 10 which is slightly inclined from the horizontal. It may be about four feet in length and as wide as desired. The screen 10 may be of ¼ inch mesh contained in a frame 11 with hopper 12 beneath the screen. The hopper may be carried by the screen as shown. A discharge outlet 13 for balled material is found in the bottom of the hopper.

The screen is supported for motion, such as a vibrating or shaking motion, and supports 14 are designated which permit such motion. Means to produce the motion is indicated at 15 which may be a reciprocating mechanism. The head or high end of the screen is covered for about one quarter of its length with a plate 16 fixed relative to the screen or its frame. The other end of the screen carries a loose plate 17 which is capable of motion relative to the screen. It merely rests in the box-like end of the screen structure and is therefore capable of motion in all directions relative to the screen, being slightly smaller in size than the distance between the sides of the frame to permit lateral motion. The loose plate may cover about one-quarter of the length of the screen.

Raw material is fed slowly to the fixed plate where it is balled as it advances along the slight incline. When the balls reach the screen 10 the minus sizes drop through the screen and the plus sizes move along. Some may be broken into smaller sizes as they progress down the incline, but the balls are so strong and so well resist such action that the loose plate is provided to give them an impact when they reach the moving loose plate. The plate may strike them and break some or it may ride over them and crush them through the screen. Some plus sizes may jump and ride on the loose plate, and such balls are permitted to roll out of the apparatus by way of an exit 18 in the frame. A delivery plate 19 is representative of means to carry off said large balls. These may be crushed and returned through the apparatus.

Moistened fines are indicated at 20, being fed to the apparatus. Balls 21 are formed on the plate and graded by the screen. Minus sizes are indicated at 22, and plus sizes at 23, of course in exaggerated proportions.

By means of the present invention it is possible to utilize various materials, especially blast furnace sludge, to form a mass which is sinterable. The invention consists not only in balling such material, but in sintering such balls of material, whereby it is possible to sinter materials which heretofore it has not been possible to sinter with efficiency.

The invention may also be practiced by reducing sinterable materials to a fine grained size, mixing carbon therewith, then balling the mixture, and sintering the balled mixture, thus to provide a material in a form and size which more readily withstands the conditions of sintering without the formation of high returns.

I claim:

1. The method of balling fine grained material for sintering which comprises moistening the fine material substantially uniformly throughout, and subjecting the moistened material in a thin layer to a motion which produces rolling, whereby the moistened material agglomerates into balls.

2. The method of balling fine grained material for sintering which comprises mixing carbon with the material to be sintered, moistening the material substantially uniformly throughout, and subjecting the moistened material in a thin layer to a motion which produces rolling, whereby the moistened material agglomerates into balls.

3. The method of balling fine grained material for sintering which comprises moistening the material substantially uniformly throughout, and subjecting the moistened material and carbon fines in admixture in a thin layer to a motion which produces rolling, whereby the moistened material and carbon agglomerates into balls.

4. The method of balling blast furnace sludge comprising a sinterable mixture of iron oxide and carbon, which comprises slightly moistening the particles of the sludge material substantially uniformly throughout, and subjecting said slightly moistened sludge particles in a thin layer to a motion which produces rolling, whereby the moistened material agglomerates into balls.

5. The method of balling fine grained material for sintering which comprises moistening the material substantially uniformly throughout and subjecting the moistened material in a thin layer to a motion which produces rolling, whereby the material agglomerates into balls, and continuing the motion for agglomeration until the mass has an average ball size of from ⅛ inch to ¼ inch.

6. The method of balling fine grained material for sintering which comprises moistening the material substantially uniformly throughout, subjecting the moistened material in a thin layer to a motion which produces rolling, whereby the material agglomerates into balls, separating the smaller balls from the larger balls, and then crushing the larger balls into smaller balls.

7. The method of forming fine particles into larger agglomerates capable of being sintered which comprises moistening the fine particles with a bonding liquor, depositing the moistened particles in a thin layer onto a moving surface whereby to produce a rolling action of the particles resulting in agglomeration of the moistened particles into ball-like masses, screening said ball-like masses to remove balls of excess size, and reducing said larger balls to smaller balls capable of passing through said screen.

In witness whereof, I hereunto subscribe my name this 29th day of January, 1930.

WILSON BRADLEY.